United States Patent [19]

Harada et al.

[11] Patent Number: 5,256,385

[45] Date of Patent: Oct. 26, 1993

[54] ADSORBENT AND CLEANING METHOD OF WASTE GAS CONTAINING KETONIC ORGANIC SOLVENTS

[75] Inventors: Masashi Harada, Shinnanyo; Takahiko Unoue, Tokuyama, both of Japan

[73] Assignee: Tosoh Corporation, Shinnanyo, Japan

[21] Appl. No.: 987,538

[22] Filed: Dec. 7, 1992

Related U.S. Application Data

[62] Division of Ser. No. 766,112, Sep. 27, 1991, abandoned.

[30] Foreign Application Priority Data

Dec. 13, 1990 [JP] Japan .................................. 2-410097
Jan. 30, 1991 [JP] Japan .................................. 3-27662

[51] Int. Cl.⁵ .................................................. C01B 17/16
[52] U.S. Cl. ...................................... 423/230; 423/247; 585/820
[58] Field of Search ................... 423/230, 245.1, 247; 585/820

[56] References Cited

U.S. PATENT DOCUMENTS

| | | | |
|---|---|---|---|
| 3,941,871 | 3/1976 | Dwyer et al. | 423/328 |
| 4,341,748 | 7/1982 | Plank et al. | 423/328 |
| 4,578,259 | 3/1986 | Morimoto et al. | 423/328 |
| 4,795,482 | 1/1989 | Gioffre et al. | |
| 4,837,000 | 6/1989 | Takatsu et al. | 423/328 |

FOREIGN PATENT DOCUMENTS

| | | |
|---|---|---|
| 0132049 | 1/1985 | European Pat. Off. |
| 84-04913 | 12/1984 | PCT Int'l Appl. |
| WO 8502848 | 7/1985 | PCT Int'l Appl. |
| WO 8803437 | 5/1988 | PCT Int'l Appl. |

OTHER PUBLICATIONS

Patent Abstracts of Japan, vol. 14, No. 304, (C-734) (4247), Jun. 29, 1990, and JP-A-2-099 138, Apr. 11, 1990, M. Harada, et al., "Deoderant".

Chemical Abstracts, vol. 99, No. 22, p. 404, Nov. 28, 1983, No. 182175k, D. Zhou, et al., "Temperature-Programmed Desorption Studies of the Acidic Properties and Catalytic Activity of HZSM-5 Zeolite of Different . . . ".

Chemical Abstracts, vol. 102, No. 28, p. 555, Jan. 28, 1985, No. 33291Y, V. R. Choudhary, et al., "Chemisorption and Temperature Programmed Desorption of Pyridine on H-ZSM-5 Zeolites".

Chemical Abstracts, vol. 110, No. 12, p. 472, Mar. 20, 1989, No. 102353z, L. Kubelkova, et al., "Acidity of Modified Y Zeolites: Effect of Nonskeletal Aluminum, Flromed by Hydrothermal Treatment, . . . ".

Chemical Abstracts, vol. 110, No. 14, p. 514, Apr. 3, 1989, No. 122308s, Y. Zhang, et al., "Study On Dealuminated Faujasite Zeolites. II. Hydroxyl Acidity".

*Primary Examiner*—R. Bruce Breneman
*Attorney, Agent, or Firm*—Oblon, Spivak, McClelland, Maier & Neustadt

[57] ABSTRACT

An adsorbent comprising zeolite with an amount of solid acid of not more than 0.05 mmol/g as determined by pyridine temperature programed desorption method and with a $SiO_2/Al_2O_3$ molar ratio of not less than 50, and a cleaning method of waste gas containing ketonic organic solvents are disclosed.

4 Claims, No Drawings

ADSORBENT AND CLEANING METHOD OF WASTE GAS CONTAINING KETONIC ORGANIC SOLVENTS

This application is a division of application Ser. No. 07/766,112, filed on Sep. 27, 1991, now abandoned.

BACKGROUND OF THE INVENTION

The present invention relates to an adsorbent useful for the cleaning of gas containing ketonic organic solvents and an use method thereof.

So far, for the cleaning of gas containing solvents, activated carbon has been used extensively as an adsorbent. When ketonic organic solvents are contained in gas, however, the formation of very small amount of decomposition products is often identified due to the catalytic action of activated carbon. Among these decomposition products, easily desorptive ones can cause a decrease in purity of recovered solvent and hardly desorptive ones can contaminate the activated carbon, both resulting in the obstacle for adsorption. Moreover, the decomposition products are most often acids, which adversely affect on the corrosion of the material of device.

Ketones produce carboxylic acids via enol intermediates due to the oxdative action on the surface of adsorbent. Because of the generation of heat, this reaction progresses abruptly and the heat of reaction generated is accumulated. When sufficient oxygen is supplied, chain reaction is triggered and the bed of activated carbon itself sometimes takes fire. The firing temperature of fresh activated carbon is around 400° to 500° C., but, if large amounts of high-boiling point substances are accumulated, it may sometimes decrease to lower than 200° C.

As described, the use of activated carbon for the cleaning of gas containing ketonic organic solvents includes various problems. For this reason, contrivances have been made in such ways that an activated carbon with low catalytic activity is used, that a damping device is installed in the upstream area of adsorption bed to prevent the temperature rise of bed due to the heat of adsorption, heat of reaction, etc., and the like. However, as long as the activated carbon is used as an adsorbent, more or less catalytic action to ketonic organic solvents is inevitable. When installing the damping device, the inhibition of catalytic action will become possible, but, if the relative humidity becomes high, the adsorption level of activated carbon to organic solvents will be decreased. Thus, the greatest care was required for the running and the management of adsorption device.

Moreover, recently, zeolites with increased hydrophobicity also begin to be used for the adsorption of organic compounds as new adsorbents in place of activated carbon (WO 84/04913 and U.S. Pat. No. 4795482).

However, when the inventors tried the adsorption of ketonic organic solvents with these hydrophobic zeolites, it was found that they exhibited the catalytic activity similarly to activated carbon. Namely, while it is possible to adsorb the ketonic organic solvents by treating waste gas containing ketonic organic solvents with activated carbon, conventional hydrophobic zeolites or the like, the ketonic organic solvents cause the decomposition or the polymerization reaction on adsorbent in the process of the regeneration of adsorbent under heat due to the catalytic action thereof. As a result, the purity of ketonic organic solvents in recovered organic solvent was low, not permitting the reuse thereof. Moreover, during repeating the adsorption and desorption procedures, the adsorption performance of adsorbent itself was also decreased and not only stabilized cleaning of waste gas was impossible, but also problems from the points of safety and maintenance such as firing and corrosion of device were present.

Paying an attention particularly to the catalytic action of adsorbent to ketonic organic solvents, the inventors made diligent investigations to provide an adsorbent which enables the recovery of high-purity ketonic organic solvents from waste gas without special procedures and further which is not in dangers of firing and decreased adsorption performance and does not exhibit the catalytic property to ketonic organic solvents.

SUMMARY OF THE INVENTION

The invention provides an adsorbent comprising zeolite with an amount of solid acid of not more than 0.05 mmol/g as determined by pyridine temperature programed desorption method and with a $SiO_2/Al_2O_3$ molar ratio of not less than 50, which is suitable for the cleaning of waste gas containing ketonic organic solvents, and an use method thereof.

DETAILED DESCRIPTION OF THE INVENTION

In following, details of the invention will be illustrated.

The $SiO_2/Al_2O_3$ molar ratio of A type zeolites, X type zeolites, Y type zeolites, etc. used commonly as general purpose adsorbents is as low as 2 to 5 and these zeolites adsorb water more selectively than organic compounds. Hence, they are not suitable as the adsorbents for cleaning waste gas containing organic solvents.

Zeolites lose the hydrophilic characteristic at a $SiO_2/Al_2O_3$ molar ratio of more than 20 and become gradually to exhibit the hydrophobic characteristic. The zeolites showing the hydrophobicity in this way are useful for the cleaning of waste gas containing organic solvents as hydrophobic adsorbents similarly to activated carbon. The hydrophobic zeolites known hitherto, however, possess simultaneously the catalytic action. Hence, when they are contacted with highly reactive organic compounds such as ketonic organic solvents, the ketonic organic solvents adsorbed cause the decomposition or the polymerization reaction in the process of the regeneration under heat due to the catalytic action of zeolites. Further, during using them as adsorbents for a long term, the remaining ketonic organic solvents become low-polymerization products or decomposition products to cause the firing, decreased adsorption performance, corrosion of device, etc. Such catalytic reaction takes place particularly violently in the desorption procedure where the regeneration is performed by heating and progresses, through slight, even in the PSA (pressure swing adsorption) procedure at low temperature. Further, because the decomposition reaction of ketonic organic solvents is an exothermic reaction, the heat of reaction is accumulated in the bed of adsorbent even in the case of PSA process not accompanying the regeneration under heat, sometimes leading to an abrupt increase in the temperature of adsorbent.

The active sites of this catalytic reaction are considered to be the acid sites in the crystal of hydrophobic zeolite. Thus, the zeolite with infinite $SiO_2/Al_2O_3$ molar ratio is considered to have no catalytic action. However, the limit of $SiO_2/Al_2O_3$ molar ratio of zeolites practically available or adjustable is around 500. This is due to that aluminum oxide is contained in the source of silicon available as a raw material of zeolites, though in very small amount. For example, in the case of direct synthetic method, very small amount of aluminum atoms in the source of silicon is selectively taken into the skeleton of zeolite crystal in the process of the crystallization. Moreover, it is practically impossible to completely remove the very small amount of aluminum atoms in zeolite even by the dealumination treatment with mineral acids etc.

Based on this reason, zeolites showing hydrophobicity has been difficult hitherto to be used as adsorbents for waste gas containing highly reactive ketonic organic solvents due to the catalytic action thereof.

The skeleton of zeolite crystal is, however, formed with $SiO_4$ and $AlO_4$ and incombustible. For this reason, the adsorbent itself is never fired in the case of the cleaning of waste gas containing combustible substances such as organic solvents, which is very charming in the aspect of safety.

The inventors made diligent investigations to obtain a zeolite adsorbent without the catalytic activity to ketonic organic solvents preparing various zeolites by direct synthetic method or methods of giving modification treatment to synthetic zeolites. As a result, it has been found that, if the amount of solid acid is not more than 0.05 mmol/g, the zeolite does not exhibit the catalytic activity to ketonic organic solvents and, if the $SiO_2/Al_2O_3$ molar ratio is not less than 50, it is hydrophobic and well adsorbs the ketonic organic solvents even under the coexistence of moisture.

As described later, the adsorbent of the invention can be obtained by the hydrothermal calcination of zeolite with desired $SiO_2/Al_2O_3$ molar ratio or by converting it to alkalimetal type or alkaline earth metal type.

In the case of the $SiO_2/Al_2O_3$ molar ratio being under 50, it is difficult to make the amount of solid acid not more than 0.05 mmol/g even by said hydrothermal treatment, while, even if converting to alkali metal type or alkaline earth metal type, the hydrophobicity is decreased and the zeolite becomes to adsorb moisture in large amounts, thus it is not suitable as an adsorbent of the invention. For this reason, the $SiO_2/Al_2O_3$ molar ratio must be not less than 50.

Moreover, as well-known, zeolites have the molecular sieve effect and the type of adsorbable molecules is determined depending on the type of zeolites. Also, in the case of recovering ketonic organic solvents from waste gas, it is only necessary to select the zeolites having larger pore sizes than the diameter of ketone molecules to be adsorbed. Usually, such pore sizes may be realized with zeolites having 8-, 10-or 12-membered oxygen ring, and the crystal structures of chabazite, offretite, mordenite, faujasite, λ, Ω, ZSM-5 and ZSM-11 type, etc. are suitable.

The preparation methods of hydrophobic zeolites with high $SiO_2/Al_2O_3$ molar ratio include a method of preparing by dealumination treatment etc. with mineral acids etc. using natural zeolites or synthetic zeolites as starting raw materials, or a direct synthetic method by mixing silica source, alumina source, alkali source and organic bases for crystallization.

As the hydrophobic zeolites prepared by dealumination treatment etc., dealuminated mordenite (N. Y. Chen, J. Phy. Chem., 80, (1), 60–64 (1976)), ultrahydrophobic Y type zeolite (GB Pat. 2014970, Studies in Surface Science and Catalysis, Volume 5, 203–210 (1980)), hydrophobic L type zeolite (Eur. Pat. 258127), etc. are know.

As the hydrophobic zeolites prepared by direct synthetic method, ZSM-5 (U.S. Pat. No. 3702886), ZSM-11 (U.S. Pat. No. 3709979), ZSM-12 (U.S. Pat. No. 3832449), ZSM-22 (U.S. Pat. No. 4556477), ZSM-23 (U.S. Pat. No. 4076842), ZSM-48 (Eur. Pat. 23089), Silicalite (U.S. Pat. No. 4061724), etc. are known.

All of these can be suitably used for the production of the inventive adsorbents, but the $SiO_2/Al_2O_3$ molar ratio of zeolites to be obtained must be not less than 50 as described previously.

Usually, the hydrophobic zeolites obtainable by above-mentioned methods are proton type. In order to convert these to zeolites with an amount of solid acid of not more than 0.05 mmol/g as determined by pyridine temperature programed desorption method, a method of extinguishing the active sites in the crystal skeleton of proton type hydrophobic zeolites by hydrothermal calcination treatment, a method of converting to alkali metal type or alkaline earth metal type by neutralization method or ion-exchange method, and the like can be selected suitably.

The conditions of hydrothermal calcination treatment for making the amount by solid acid not more than 0.05 mmol/g differ depending on the structure of zeolites and the $SiO_2/Al_2O_3$ molar ratio, but, by contriving the conditions as below, aimed adsorbents can be obtained regardless of the structure of zeolites, if the $SiO_2/Al_2O_3$ molar ratio is not less than 50.

The concentration of steam in hydrothermal calcination treatment is preferable to be not less than 2 vol. % and the concentration of steam of 5 vol. % or more is a practical condition. When the concentration of steam is high, the inventive adsorbents can be obtained even under conditions of calcination temperature being relatively mild. Through the hydrothermal calcination at a temperature under 500° C., however, it is difficult to completely extinguish the catalytic activity of adsorbent to ketonic organic solvents. Also, if over 1200° C., the crystal structure itself of hydrophobic zeolites tends to collapse. That is, the preferable temperature range for performing the hydrothermal calcination is 500° to 1200° C., preferably 600° to 1000° C. The time for the hydrothermal calcination treatment differs depending on the concentration of steam and calcination temperature, but more than 30 minutes are required within a said temperature range.

When converting to alkali metal type or alkaline earth metal type, it is only necessary to replace protons with ions such as Li, Na, K, Cs, Be, Mg, Ca, Sr and Ba by neutralization method or ion-exchange method. Alkali metal type or alkaline earth metal type zeolites are unsuitable for the inventive adsorbents, because the hydrophobicity decreases at the $SiO_2/Al_2O_3$ molar ratio of under 50 to adsorb moisture in large amounts. Moreover, in such case that the $SiO_2/Al_2O_3$ molar ratio is under 200 and the cationic ions are of alkaline earth metal with bivalence, local imbalance of charges in often caused in zeolite. Namely, when the $SiO_2/Al_2O_3$ molar ratio is under 200, the alkali metal type with monovalence such as Li, Na, K or Cs is more preferable because of lack of the catalytic activity to ketonic organic solvents.

As the methods of converting powder of proton type hydrophobic zeolites to alkali metal type or alkaline earth metal type, there are neutralization method, ion-exchange method, combined method of both, etc. The neutralization method is a method wherein an aqueous solution of hydroxide of alkali metal or alkaline earth metal is slowly added dropwise to the slurried proton type hydrophobic zeolite to neutralize the sites of solid acid of zeolite, thus converting to alkali metal type or alkaline earth metal type. The ion-exchange method is a method wherein proton type hydrophobic zeolite is immersed into an aqueous solution of salt of alkali metal or alkaline earth metal to exchange ions at a temperature of ambient temperature to 100° C., thus converting to alkali metal type or alkaline earth metal type. In the case of ion-exchange method, when reaching the exchange equilibrium, the ion-exchange does not progress further and perfect alkali metal type or alkaline earth metal type cannot be achieved only by one time ion-exchange, hence further several times ion-exchanges should be repeated. Moreover, the combined method of both is a method wherein hydrophobic zeolite is made into slurry with an aqueous solution of salt of alkali metal or alkaline earth metal and neutralized with an aqueous solution of hydroxide of alkali metal or alkaline earth metal for preparation.

According to this combined method, perfect alkali metal type hydrophobic zeolites can be obtained and the procedure is also simple, thus this is the most rational method. However, even if any method may be used for preparation, the hydrophobic zeolites can be used suitably as the inventive adsorbents, provided they are of perfect alkali metal type or alkaline earth metal type. The alkali metal type or alkaline earth metal type hydrophobic zeolites thus obtained are further washed sufficiently and dried. If the washing procedure is not enough, the adsorption performance sometimes decreases due to the alkali metal salt adhered thereto.

As a measurement method of acidic property of zeolites, there is relatively simple temperature programed desorption method (TPD method). In the TPD method, basic substance (usually, thermally stable ammonia, pyridine, etc. are used) is adsorbed onto the sample, and then this is desorbed at a constant velocity while raising temperature. At this time, since the adsorption of basic substance onto the acid sites is considered to be 1:1 based on the acid-base reaction, the amount of basic substance desorbed can be regarded as an amount of acid sites. Moreover, since the basic substance adsorbed onto stronger acid sites is considered not to be eliminated until higher temperature, the desorbed temperature indicates the strength of acid sites. In this way, by the TPD method, the amount of acid and the strength of acid can be known simultaneously. The TPD method with pyridine (Py-TPD method) may be conducted along following procedure using a flow type TPD device. Namely, the sample is packed into the adsorption tube under the conditions below and vacuum exhaustion is conducted as a pretreatment. Pyridine is adsorbed onto the sample and, successively, temperature is raised at a constant velocity while following He as a carrier gas to deaerate the gas phase and pyridine phisically adsorbed to observe the desorption spectrum.

Sample: 0.4 g
Pretreatment: 500° C., vacuum exhaustion for 1 hour
Adsorption room temperature: 15 minutes, 50–60 Torr
Deaeration: 100° C., vacuum exhaustion for 5 minutes
Desorption: flow of He 60 cc/min temperature-raising velocity 10° C./min With zeolite adsorbents, when the amount of solid acid by this Py-TPD is higher than 0.05 mmol/g, the decomposition occurs on desorption because of many acid sites being main active sites, resulting in the decreased purity of organic solvent recovered. In other words, the catalytic property to ketonic organic solvents is too high, which is unpreferable. If not more than 0.05 mmol/g, the acid sites being active sites become less and the decomposition becomes hard to occur an desorption permitting the recovery of organic solvents with high purity. In other words, if the amount of solid acid is made not more than 0.05 mmol/g, the ketonic organic solvents do not cause the decomposition or the polymerization reaction on adsorbent due to the catalytic action thereof making it possible to recover and to reuse the ketonic organic solvents with high purity.

The adsorbents are usually used in a shape of cylinder, sphere or honeycomb. For converting the powder of zeolites to these shapes, inorganic binder components such as silica sol, silica gel and clay minerals are added to increase the bondability between carrier and zeolite crystals or zeolite crystals each other because zeolite crystal itself has no bondability, followed by secondary processings such as molding and honeycombing. The binder component is preferable to be inert and ones showing the reaction activity to ketonic organic solvents such as alumina sol and alumina gel are unsuitable. Moreover, after the molding or honeycombing, the calcination treatment is required to retain the shape of these secondary processed products. At this time, if the calcination procedure is performed under the hydrothermal conditions, it is not needed to hydrothermally calcine the powder of zeolites beforehand. Namely, as a rational implementing method of obtaining the inventive adsorbents by the hydrothermal calcination treatment, a method of first performing the secondary processing of the powder of hydrophobic zeolites, then successively performing the hydrothermal calcination is possible. Of course, the powder of zeolites after the hydrothermal calcination may be secondarily processed and then calcined under mild conditions. When the proton type zeolites are converted to alkali metal type or alkaline earth metal type by the neutralization method, ion-exchange method or combined method thereof, washing and drying are accompanied. If converting to alkali metal type or alkaline earth metal type after the secondary processing, such troubles that the secondarily processed product is broken in this process, that extra salt of alkali metal or alkaline earth metal is left behind adhering as it is due to the defficiency of washing leading to decreased adsorption performance, and the like may be caused. Hence, for obtaining the alkali metal type or alkaline earth metal type adsorbents, a method of first converting the powder of proton type zeolites to alkali metal type or alkaline earth metal type by the neutralization method, ion-exchange method or combined method thereof, then performing the secondary processings such as molding and honeycombing is a rational implementing method.

Here, molded products of zeolites produced without using binder are shown in publications of Japanese Unexamined Patent Publication No. Sho 62-70225, No. Sho 62-138320, etc. Zeolites, the amount of solid acid by Py-TPD thereof being brought to not more than 0.05 mmol/g by hydrothermal calcination treatment or neutralization or ion-exchange method using hydrophobic zeolites after the dealumination treatment by such molded products of zeolites containing no binder component, have high adsorption level, which are more suitable as the inventive adsorbents, The adsorbents of the invention are particularly useful as adsorbents for cleaning waste gas containing ketonic organic solvents such as methyl ethyl ketone, methyl isobutyl ketone and cyclohexanone. They can be suitably used in any device of fixed bed adsorption device, fluidized bed adsorption device, moving bed adsorption device, honey comb rotor thickening device, etc. Moreover, as the methods for adsorption and desorption procedure, there are pressure swing adsorption method, thermal swing adsorption method, combined method thereof, etc., but the inventive adsorbents can be applied to any mode.

With the adsorbents of the invention, the adsorption procedures such as thickening of and solvent recovery from waste gas of ketonic organic solvents, which were difficult hitherto, have become possible without special contrivance for the adsorption device. Moreover, since the inventive adsorbents do not exhibit the catalytic property at all, the dangers such as corrosion of adsorption device and firing of adsorbent bed, which were problematic hitherto, have been eliminated.

In following, explanation will be made about the examples of the invention.

EXAMPLE 1

Y type zeolite with a $SiO_2/Al_2O_3$ molar ratio of 14 and a lattice constant of 24.33 angstroms was dealuminated with 1.5N aqueous solution of hydrochloric acid of 50° C. to obtain hydrophobic Y type zeolite with a $SiO_2/Al_2O_3$ molar ratio of 500. To 100 parts by weight of this hydrophobic zeolite were added 25 parts by weight of clay as a binder and a cylindrical molded product with a diameter of 3 mm was obtained. This molded product was calcined for 2 hours at 800° C. in air flow with a steam concentration of 20 vol. % to obtain an adsorbent.

COMPARATIVE EXAMPLE 1

On the other hand, to 100 parts by weight of Y type zeolite with a $SiO_2/Al_2O_3$ molar ratio of 14 not subjected to the dealumination treatment with aqueous solution of hydrochloric acid were added 25 parts by weight of clay as a binder and a cylindrical molded product with a diameter of 3 mm was obtained. This molded product was calcined for 2 hours at 800° C. in air flow with a steam concentration of 20 vol. % to obtain an adsorbent.

EXAMPLE 2

Synthetic mordenite type zeolite was subjected to the dealumination treatment to obtain hydrophobic mordenite type zeolite with a $SiO_2/Al_2O_3$ molar ratio of 200. To 100 parts by weight of this hydrophobic mordenite type zeolite were added 25 parts by weight of silica sol as a binder and a cylindrical molded product with a diameter of 3 mm was obtained. This molded product was calcined for 10 hours at 700° C. in air flow with a steam concentration of 20 vol. % to obtain an adsorbent.

COMPARATIVE EXAMPLE 2

Except that the calcination was carried out in dried air, treatment was made similarly to Example 2 to obtain an adsorbent.

EXAMPLE 3

By the direct synthetic method, ZSM-5 type zeolite with a $SiO_2/Al_2O_3$ molar ratio of 200 was obtained. After organic bases in zeolite were removed by calcining for 4 hours at 600° C. in atmosphere, 500 ml of 1M aqueous solution of NaCl were added to 100 g of this proton type hydrophobic ZSM-5, which was stirred to make a slurry. To this slurry was slowly added 0.1NAOH for neutralization. Further, this zeolite was washed sufficiently with warm water of 60° C. and dried overnight at 120° C. to obtain sodium type hydrophobic ZSM-5. To 100 parts by weight of sodium type hydrophobic ZSM-5 were added 25 parts by weight of silica sol as a binder, and a cylindrical molded product with a diameter of 1.5 mm was obtained, which was calcined for 2 hours at 600° C. in atmosphere to obtain an adsorbent.

COMPARATIVE EXAMPLE 3

To 100 parts by weight of proton type ZSM-5 type zeolite with a $SiO_2/Al_2O_3$ molar ratio of 200 were added 25 parts by weight of silica sol as a binder and a cylindrical molded product with a diameter of 1.5 mm was obtained, which was calcined for 2 hours at 600° C. in atmosphere to obtain an adsorbent.

EXAMPLE 4

Using synthetic mordenite type zeolite with a $SiO_2/Al_2O_3$ molar ratio of 20, the dealumination treatment was conducted with mineral acid to obtain proton type hydrophobic mordenite. Subsequent treatment was made similarly to Example 3 to obtain an adsorbent.

COMPARATIVE EXAMPLE 4

On the other hand, to 100 parts by weight of proton type hydrophobic mordenite with a $SiO_2/Al_2O_3$ molar ratio of 200 were added 25 parts by weight of silica sol as a binder, which was made into a cylindrical molded product with a diameter of 1.5 mm. This molded product was calcined for 2 hours at 600° C. in atmosphere to obtain an adsorbent.

Of the adsorbents obtained in respective examples above, measurement of moisture adsorption capacity, determination of the amount of solid acid by Py-TPD method and adsorption and desorption test to methyl ethyl ketone were carried out by following methods. These results are shown in Table 1 and Table 2.

MOISTURE ADSORPTION CAPACITY

The adsorbent was placed in a crucible ($w_1$ g) having been made constant weight and, after heated for 2 hours at 350° C. in an electric furnace to remove moisture, the adsorbent in crucible was cooled in a desiccator accommodated with drier and then weight ($w_2$ g) was measured. This was then placed in a desiccator kept at a relative humidity of 30% and, after allowed to stand for 24 hours at 20° C., the weight ($w_3$ g) was measured. The moisture adsorption capacity was determined using following equation.

Moisture adsorption capacity(wt.
%) = {$(w_3-w_2)/(w_2-w_1)$} × 100

DETERMINATION OF THE AMOUNT OF SOLID ACID BY PY-TPD METHOD

The adsorbent was packed into a measurement tube and, after removed the moisture by treating 1 hour at 500° C. under vacuum, nitrogen was introduced, which was retained for 1 hour at 500° C. and then cooled to 300° C. Further, pyridine gas vaporized with nitrogen was adsorbed onto the sample for 20 minutes at 300° C. Next, the temperature of sample was increased from 300° C. to 950° C. at a temperature-raising velocity of 10° C./min and the amount of pyridine coming to be eliminated was measured by means of gas chromatography (detector: flame ionization detector). The amount of solid acid in sample was determined by integrating the amount of pyridine eliminated on diagram within a range of 300° to 950° C.

ADSORPTION AND DESORPTION TEST TO METHYL ETHYL KETONE

A glass column with an inner diameter of 6 cm and a length of 45 cm was used for the adsorption and desorption test. After packed the adsorbent into this column so as the height of bed to become 35 cm, adsorption and desorption test was conducted. The adsorption test was conducted at 25° C. Air with a methyl ethyl ketone concentration of 3000 ppm (moisture concentration 10000 ppm) was flown through the bed of adsorbent at a flow rate of 0.2 m/sec and the time when the concentration of methyl ethyl ketone at exit portion reached 150 ppm was made saturation time (min). Further, the adsorption test was continued until the concentration of methyl ethyl ketone at exit portion reached 3000 ppm and the weight of column (Wa) after the completion of adsorption test was measured.

For the desorption test, column was heated to 150° C. by ribbon heater while flowing dried air through the bed of adsorbent adsorbed methyl ethyl ketone at 0.075 m/sec. After continued until the exit concentration of methyl ethyl ketone reached lower than 10 ppm, column was cooled and the weight of column (Wd) after the completion of desorption test was measured. Moreover, the concentration of methyl ethyl ketone in eliminated gas was integrated on diagram to determine the amount of methyl ethyl ketone recovered (Wr).

The recovery rate (%) of methyl ethyl ketone was calculated using following equation. Results are shown in Table 1.

Recovery rate of methyl ethyl ketone
$(\%) = Wr \times 100/(Wa - Wb)$

The concentrations of methyl ethyl ketone at entrance and exit of the bed of adsorbent was measured by means of gas chromatography (detector: FID).

TABLE 1

| | Saturation time (min) | Recovery rate of methyl-ethyl ketone (%) | Amount of solid acid (mmol/g) |
|---|---|---|---|
| Example 1 | 260 | 99.9 | 0.00 |
| Comparative example 1 | 260 | 94.8 | 0.14 |
| Example 2 | 151 | 99.2 | 0.03 |
| Comparative example 2 | 155 | 84.7 | 0.08 |

TABLE 2

| | Moisture adsorption level (wt. %) | Saturation time (min) | Recovery rate of methyl-ethyl ketone (%) | Amount of solid acid (mmol/g) |
|---|---|---|---|---|
| Example 3 | 2.33 | 102 | 99.8 | 0.03 |
| Comparative example 3 | 2.76 | 90 | 65.1 | 0.12 |
| Example 4 | 2.55 | 57 | 99.8 | 0.01 |
| Comparative example 4 | 2.73 | 60 | 84.7 | 0.08 |

What is claimed is:

1. A method of cleaning waste gas containing ketonic organic solvents comprising contacting the waste gas containing ketonic organic solvents with an absorbent comprising zeolite with an amount of solid acid of not more than 0.05 mmol/g as determined by pyridine temperature programmed desorption method and with a $SiO_2/Al_2O_3$ molar ratio of not less than 50.

2. The method of cleaning waste gas containing ketonic organic solvents according to claim 1, wherein the zeolite is obtained by hydrothermal calcination treatment.

3. The method of cleaning waste gas containing ketonic organic solvents according to claim 1, wherein the adsorbent is produced by calcining a zeolite with a $SiO_2/Al_2O_3$ molar ratio of not less than 50 under conditions of steam concentration of not less than 2 vol. %, calcination temperature of 500° to 1,200° C. and calcination time of not less than 30 minutes.

4. The method of cleaning waste gas containing ketonic organic solvents according to claim 1, wherein the zeolite comprises hydrophobic zeolite or alkali metal type or alkaline earth metal type.

* * * * *

UNITED STATES PATENT AND TRADEMARK OFFICE
CERTIFICATE OF CORRECTION

PATENT NO. : 5,256,385

DATED : OCTOBER 26, 1993

INVENTOR(S) : MASASHI HARADA ET AL

It is certified that error appears in the above-identified patent and that said Letters Patent is hereby corrected as shown below:

Column 3, line 58, "faujasite, $\lambda$, $\Omega$, ZSM-5" should read
--faujasite, L, $\Omega$, ZSM-5--.

Column 8, line 15, "0.1 NAOH for neutralization" should read
--0.1N NaOH for neutralization--;
line 53, "2re" should read --are--.

Signed and Sealed this

Twenty-eight Day of March, 1995

Attest:

BRUCE LEHMAN

Attesting Officer     *Commissioner of Patents and Trademarks*

UNITED STATES PATENT AND TRADEMARK OFFICE
CERTIFICATE OF CORRECTION

PATENT NO. : 5,256,385
DATED : October 26, 1993
INVENTOR(S) : Masashi Harada et al.

It is certified that error appears in the above-indentified patent and that said Letters Patent is hereby corrected as shown below:

On the title page, Item [75],

The second inventor's name, should read: --Takahiko Inoue--

Signed and Sealed this

Sixteenth Day of May, 1995

*Attest:*

BRUCE LEHMAN

*Attesting Officer*     *Commissioner of Patents and Trademarks*